US012482947B2

(12) United States Patent
Mun et al.

(10) Patent No.: US 12,482,947 B2
(45) Date of Patent: Nov. 25, 2025

(54) ANTENNA MODULE MOUNTABLE ON A PRINTED CIRCUIT BOARD, AND A SET OF TWO ANTENNA MODULES COMPRISING THE ANTENNA MODULE AND AN AUXILIARY ANTENNA MODULE

(71) Applicant: THE ANTENNA COMPANY INTERNATIONAL N.V., Willemstad (CW)

(72) Inventors: Sung Bin Mun, Eindhoven (NL); Diego Caratelli, Eersel (NL); Javier Armando Arrincon Rodriguez, Eindhoven (NL)

(73) Assignee: THE ANTENNA COMPANY INTERNATIONAL N.V., Willemstad (CW)

( * ) Notice: Subject to any disclaimer, the term of this patent is extended or adjusted under 35 U.S.C. 154(b) by 196 days.

(21) Appl. No.: 18/495,319

(22) Filed: Oct. 26, 2023

(65) Prior Publication Data

US 2024/0145925 A1 May 2, 2024

(30) Foreign Application Priority Data

Oct. 27, 2022 (NL) ...................................... 2033403

(51) Int. Cl.
*H01Q 9/04* (2006.01)
*H01Q 1/22* (2006.01)

(52) U.S. Cl.
CPC ............... *H01Q 9/045* (2013.01); *H01Q 1/22* (2013.01)

(58) Field of Classification Search
CPC .......... H01Q 1/22; H01Q 5/371; H01Q 5/392; H01Q 9/045; H01Q 9/42
See application file for complete search history.

(56) References Cited

U.S. PATENT DOCUMENTS

2005/0270243 A1* 12/2005 Caimi .................... H01Q 5/321 343/702
2011/0273338 A1 11/2011 Wolf
2012/0182186 A1 7/2012 Yang et al.
2013/0214985 A1 8/2013 Wolf et al.
(Continued)

FOREIGN PATENT DOCUMENTS

EP 1973197 A1 * 9/2008 ............. H01Q 5/385

OTHER PUBLICATIONS

Search Report dated Jan. 21, 2023 issued in corresponding Dutch Application No. 2033403.

*Primary Examiner* — Raymond R Chai
(74) *Attorney, Agent, or Firm* — Nath, Goldberg & Meyer; Joshua B. Goldberg

(57) ABSTRACT

An antenna module is provided which is mountable on a surface of a printed circuit board which contains an electrically conductive layer that constitutes a ground plane for the antenna module. The antenna module is embodied as a planar body having a top surface and a bottom surface, wherein the bottom surface is configured to be mounted on the printed circuit board and the top surface is facing away from the bottom surface. The planar body is a layered structure comprising a central planar layer, a first circuitry, a second circuitry, and a plurality of vias. The antenna module is an electrically active component and the first circuitry includes a feeding strip of electrically conductive material that is connected to at least some of the vias.

27 Claims, 5 Drawing Sheets

(56) References Cited

U.S. PATENT DOCUMENTS

| | | | | |
|---|---|---|---|---|
| 2014/0002310 | A1 | 1/2014 | Kim | |
| 2016/0104938 | A1* | 4/2016 | Hsu | H01Q 13/106<br>343/767 |
| 2016/0277062 | A1* | 9/2016 | Cheon | H04B 1/3827 |
| 2019/0115654 | A1* | 4/2019 | Huang | H01Q 9/40 |
| 2022/0021105 | A1* | 1/2022 | Hsu | H01Q 1/243 |

* cited by examiner

ANTENNA MODULE MOUNTABLE ON A PRINTED CIRCUIT BOARD, AND A SET OF TWO ANTENNA MODULES COMPRISING THE ANTENNA MODULE AND AN AUXILIARY ANTENNA MODULE

The present invention relates to an antenna module that is designed to be mounted on a printed circuit board. The invention is also directed to a set of two antenna modules that co-operate as an assembly when mounted on a printed circuit board. Finally, the invention relates to a printed circuit board on which an antenna module, or a set of antenna modules, is mounted.

In the technological field, so-called surface mounted devices (SMDs) for a printed circuit board (PCB) are well known for their purpose of further expanding the technical functionality of the printed circuit board.

In this context, the use of antenna modules which are mountable on a PCB has become very popular, and has developed significantly over the years. In order to comply with a vast variety of possible antenna applications, the antenna modules are preferably designed to be functional over a broad frequency range spanning from 0.70 GHz to 6 GHz.

A fundamental principle of the design of a mountable antenna module for a PCB, is that the printed circuit board itself contains an electrically conductive layer that constitutes a ground plane for the antenna module, while the antenna module itself contains a circuitry of electrically conductive material which is electrically fed in order to propagate electromagnetic waves. Effectively, the antenna is composed by the combination of the PCB and the antenna module that is mounted thereon.

With the ongoing miniaturization in electronic equipment, popular printed circuit boards nowadays are limited in size to such an extent that only a relatively small ground plane can be accommodated. These relatively small ground planes typically have a width from 40 mm to 60 mm and a length of 100 mm or less. When an antenna module is mounted on such a PCB having a relatively small ground plane, it has been observed that the total efficiency of the antenna is significantly reduced. It is noted for the sake of clarity, that the property 'total efficiency' of an antenna is also referred to in the field as 'total radiated power' of the antenna, and is a property which is expressed as a percentage.

Especially in the frequency range from 0.70 GHz to 1.0 GHz, it has been observed that the total efficiency of the antenna could drop below a critical threshold value of 35%, when an antenna module is mounted on a printed circuit board that has a relatively small ground plane as indicated above.

When the total efficiency of the antenna is below this critical value of 35%, the functionality of the antenna becomes severely compromised. Such a decrease is generally not acceptable for practical use, especially in regard of applications of the antenna in hand-held devices such as for instance in mobile phones.

In view of the above drawbacks, the object of the present invention is to improve the total efficiency of an antenna that is constructed by an antenna module which is mounted on a PCB with a relatively small ground plane. The invention especially aims at avoiding a drop of the total efficiency below the threshold value of 35% as much as possible, within the broad frequency range spanning from 0.70 GHz to 6 GHz.

In particular, the invention is aimed at achieving a total efficiency of 35% or higher over the frequency range from 0.70 GHz to 1.00 GHz for an antenna module which is mounted on a PCB with a relatively small ground plane.

In order to achieve the above objective, the present invention according to a first aspect thereof, is directed to the provision of an antenna module which is mountable on a surface of a printed circuit board which contains an electrically conductive layer that constitutes a ground plane for the antenna module, wherein the antenna module is embodied as a planar body having a top surface and a bottom surface, wherein the bottom surface is configured to be mounted on the printed circuit board and the top surface is facing away from the bottom surface, wherein the planar body is a layered structure comprising:

a central planar layer of dielectric material;

a first circuitry of electrically conductive material on a bottom side of the central planar layer;

a second circuitry of electrically conductive material on a top side of the central planar layer;

a multitude of vias of electrically conductive material that extend through the central planar layer from the bottom side to the top side thereof;

wherein the antenna module is an electrically active component and the first circuitry includes a feeding strip of electrically conductive material that is connected to at least some of the vias, wherein the second circuitry is formed by a radiation layer of electrically conductive material which radiation layer is electrically connected to at least some, and preferably all, of the vias, which radiation layer has outer edges that constitute a periphery of the radiation layer, wherein the radiation layer is provided with multiple slots that divide the radiation layer into sections that are interconnected to each other as branches, wherein the slots are provided in the radiation layer in such a way that each of the slots extend from an outer edge of the radiation layer, and wherein preferably the slots include one slot which extends from one outer edge of the radiation layer, and another slot which extends from another outer edge of the radiation layer.

It has been found, that an antenna module according to the invention which is mounted on a surface of a printed circuit board which contains an electrically conductive layer that constitutes a ground plane for the antenna module, results in an antenna that has an attractive total efficiency within the broad frequency range spanning from 0.70 GHz to 6 GHz. This attractive total efficiency is also achieved, when small PCBs are used which have a ground plane of a length of 100 mm or less.

In particular, the attractive total efficiency is such that it is above the threshold value of 35% for most of the frequencies within the above broad range. More in particular, a total efficiency of 35% or higher is achieved over the frequency range from 0.70 GHz to 1.00 GHz.

For clarity, it is noted that the mounting on a surface of a printed circuit board of the antenna module according to the invention may be performed in any usual manner commonly known to the skilled person, such as by soldering, by gluing, or by the use of mechanical connectors.

Furthermore, it is noted that one free end of the feeding strip is configured to be connectable to an electrical feed in order to activate the antenna module electrically.

It is preferred in the antenna module according to the invention, that the bottom side of the central planar layer furthermore includes one or more separate strips of electrically conductive material, which separate strips comprise strips that are connected to vias, and/or strips that are not connected to vias.

These strips contribute to the propagation of electromagnetic waves from the antenna module, which strips are active structures when connected to vias, or passive structures when not connected to vias.

It is particularly preferred in the antenna module according to the invention, that the slots include a slot which has one end extending from one outer edge of the radiation layer and another end extending from another outer edge of the radiation layer.

Such a slot which extends between two different outer edges of the radiation layer, has a specific contribution to the propagation of electromagnetic waves from the antenna module.

It is also preferred in the antenna module according to the invention, that the slots include a slot which extends from one outer edge of the radiation layer and has one end extending in the radiation layer as an isolated dead-end.

Such a slot having one isolated dead-end has a further specific contribution to the propagation of electromagnetic waves from the antenna module.

In the antenna module according to the invention, the following embodiments of the slots that are provided in the radiation layer, are independently preferred in view of achieving the objective of the invention:

- the slots are composed by a linkage of linear slot sections which are interconnected to each other in an orthogonal orientation, such that the slots comprise slot sections which are L-shaped and/or F-shaped;
- the slots are composed by a linkage of linear slot sections which extend parallel to one or more of the outer edges of the radiation layer;
- at least one slot, and preferably at least two slots, have an outer linear slot section which extends parallel to an outer edge of the radiation layer and is present at the same outer edge so that the outer linear slot section forms an interruption of the respective outer edge of the radiation layer, which interruption extends over a length equal to length of the outer linear slot section.

It is furthermore preferable in the antenna module according to the invention, that the radiation layer includes one or more isolated sections which are delimited by the slots and which are not interconnected with other sections of the radiation layer, wherein preferably such isolated sections are not connected to the vias.

These isolated sections can be typified as 'islands' which are included by the radiation layer.

In view of the overall design of the antenna module according to invention, it is preferred that:

- the radiation layer has a width and a length, and the periphery of the radiation layer comprises two long outer edges extending in the width direction, and two short outer edges extending in the length direction, wherein preferably the periphery has a rectangular shape; and/or
- the central planar layer has a width and a length, and has a periphery comprising two long outer edges extending in the width direction, and two short outer edges extending in the length direction, wherein a substantial part of the central planar layer is covered by the radiation layer, preferably the substantial part covered is larger than 70%.

It is particular preferable in the antenna module according to the invention, that the slots comprise a first slot which is composed by a linkage of linear slot sections that includes one L-shaped slot section, which first slot has one end extending in the radiation layer as an isolated dead-end, wherein preferably the first slot includes a linkage of two L-shaped slot sections which together form a zig-zag shape.

It is herein particularly preferred that the first slot extends to a first outer edge of the radiation layer which is a short outer edge extending in a length direction of the radiation layer.

It is also preferable in the antenna module according to the invention, that the slots comprise a second slot which is composed by a linkage of linear slot sections that includes at least one F-shaped slot section and at least one L-shaped slot section, preferably at least one F-shaped slot section and a multitude of L-shaped slot sections.

It is herein particularly preferred that the second slot includes one or two L-shaped slots which have one end extending in the radiation layer as an isolated dead-end.

It is furthermore particularly preferred that the second slot extends to a second outer edge of the radiation layer which is an outer edge extending in a length direction of the radiation layer.

In view of the above defined first slot and second slot which preferably extend from a respective first outer edge and second outer edge, it is noted that the first outer edge and the second outer edge could be one and the same outer edge, but are preferably two distinctive outer edges which run parallel to each other.

Especially preferred in the antenna module according to the invention, is that the second slot extends from the second outer edge of the radiation layer to a third outer edge of the radiation layer, wherein preferably the third outer edge is an outer edge extending in a width direction of the radiation layer.

It is particular preferable in the antenna module according to the invention, that the sections of the radiation layer that are interconnected include one, two or more branches that have an L-shaped contour.

It is furthermore preferable in the antenna module according to the invention, that the radiation layer contains at least one isolated section which has an L-shaped contour.

In regard of the dimensions of the antenna module according to the invention, it is preferable that the antenna module has:

- an overall width from 40 mm to 60 mm, preferably from 45 to 55 mm;
- and/or an overall length of 10 mm to 30 mm, preferably from 15 mm to 25 mm;
- and/or an overall thickness of 2 mm to 5 mm, preferably from 3 mm to 4 mm.

In general, the auxiliary antenna module may have an overall width varying within the range of 5 mm to 75 mm, and/or an overall length varying within the range of 1 mm to 40 mm, and/or an overall thickness varying within the range of 0.1 mm to 5 mm.

Apart from the above advantages achieved by the antenna resulting from an antenna module mounted onto a PCB, the inventors have found that the total efficiency of the antenna may become compromised when the antenna module is mounted on a PCB having a ground plane which is further reduced to a length smaller than 80 mm. Specifically for ground planes of such further reduced length, it was found that a total efficiency above 35% may not be achievable over the whole frequency range from 0.70 GHz to 1.00 GHz.

With regard to this specific drawback, there is thus an additional objective to improve the antenna module according to the first aspect of the invention.

In order to achieve this additional objective as well, a second aspect of the invention relates to the provision of:

A set of two antenna modules which are both mountable on a surface of a printed circuit board in order to form a co-operating assembly of two antenna modules on the printed circuit board which contains an electrically conductive layer that constitutes a ground plane for both antenna modules, wherein the set of two antenna modules contains an antenna module according to the first aspect of the invention and an auxiliary antenna module, wherein the auxiliary antenna module is embodied as a planar body having a top surface and a bottom surface, wherein the bottom surface is configured to be mounted on the printed circuit board and the top surface is facing away from the bottom surface, wherein the planar body is a layered structure comprising:

a central planar layer of dielectric material;

separate strips of electrically conductive material provided on a bottom side of the central planar layer;

an auxiliary layer of electrically conductive material on a top side of the central planar layer;

a multitude of vias of electrically conductive material that extend through the central planar layer from the bottom side to the top side thereof;

wherein the auxiliary antenna module is a passive component which is not fed by an electric feed, wherein the auxiliary layer is connected to at least some, and preferably all, of the vias, and wherein the separate strips on the bottom side of the central planar layer comprise strips that are connected to vias, and/or strips that are not connected to vias.

It has been observed that by mounting on the PCB an assembly of the antenna module according to the first aspect of the invention, together with an auxiliary antenna module, the resultant antenna as a whole is capable of achieving a total efficiency above 35% over the whole frequency range from 0.70 GHz to 1.00 GHz even when using a PCB that has a relatively small ground plane with a length in the range of 40 mm to 80 mm.

It is additionally noted, that the auxiliary layer of electrically conductive material could be provided with slots, but could also be free from slots.

Preferably, in the set of two antenna modules according to the invention, the auxiliary layer has a width and a length, and has a periphery comprising two long outer edges extending in the width direction, and two short outer edges extending in the length direction, wherein preferably the periphery has a rectangular shape.

It is furthermore preferred in the set of two antenna modules according to the invention, that the central planar layer has a width and a length, and has a periphery comprising two long outer edges extending over the width, and two short outer edges extending over the length, wherein a substantial part of the central planar layer is covered by the auxiliary layer, preferably the substantial part covered is larger than 70%, more preferably larger than 80%.

In view of the respective dimensions of the set of two antenna modules according to the invention, it is preferable that the auxiliary antenna module has:

an overall width from 40 mm to 60 mm, preferably from 45 to 55 mm;

and/or an overall length of 5 mm to 20 mm, preferably from 10 mm to 15 mm;

and/or an overall thickness of 2 mm to 5 mm, preferably from 3 mm to 4 mm.

In general, the auxiliary antenna module may have an overall width varying within the range of 5 mm to 75 mm, and/or an overall length varying within the range of 1 mm to 40 mm, and/or an overall thickness varying within the range of 0.1 mm to 5 mm.

A third aspect of the invention relates to the provision of:

a printed circuit board having a surface side on which an antenna module according to the first aspect of the invention is mounted, wherein the printed circuit board contains an electrically conductive layer that constitutes a ground plane for the antenna module, and wherein preferably the feeding strip of the antenna module is electrically connected to the printed circuit board.

It is noted, that the antenna module may be mounted on a surface of a printed circuit board in any suitable manner commonly known to the skilled person, such as by soldering, by gluing, or by the use of mechanical connectors.

Such a printed circuit board is capable of achieving the objective of the invention as set out above in relation to the first aspect of the invention.

It is especially preferred that the printed circuit board according to the invention has a surface side on which an auxiliary antenna module as defined above for the second aspect of the invention is mounted, wherein the antenna module and the auxiliary antenna module are mounted on the printed circuit board thereby forming a co-operating assembly which interacts with the ground plane of the printed circuit board, wherein preferably the auxiliary antenna module is mounted on a surface side of the printed circuit board, which is opposed to the surface side of the printed circuit board on which the antenna module is mounted.

It is noted, that in the context of this third aspect of the invention, the auxiliary antenna module may alternatively be mounted on the same surface side as the antenna module.

Such a printed circuit board being provided with an assembly of an antenna module and an auxiliary antenna module, is capable of achieving the objective of the invention as set out above in relation to the first, as well as the second aspect of the invention.

It is furthermore preferred in the printed circuit board according to the invention, that the surface side of the printed circuit board on which the antenna module is mounted is a dedicated surface area in which area the ground plane does not extend, and/or the surface side of the printed circuit board on which the auxiliary antenna module is mounted, is a dedicated surface area in which area the ground plane does not extend.

In view of the dimensions of the printed circuit board according to the invention, it is preferable that the ground plane of the printed circuit board has:

an overall width from 40 mm to 60 mm, preferably from 45 to 55 mm, and/or an overall length of 30 mm to 100 mm, preferably from 50 mm to 70 mm.

Typically, the printed circuit board that is used in the invention has an overall length of 40 mm to 110 mm, preferably from 60 mm to 80 mm, and preferably includes one or two dedicated areas for mounting of one or both antenna modules, and in which dedicated areas the ground plane does not extend.

Suitable materials that are used in the production of the antenna module and the auxiliary antenna module are well known to skilled person and include for instance as an electrically conductive material: copper, silver or an alloy thereof;

as a dielectric layer: a laminate material (FR-4) made from polytetrafluoroethylene, polypropylene, urethane acrylate, glass, and/or ceramic material.

EXAMPLES

The invention will be explained by the following examples which represent preferred embodiments of the invention, and which are depicted in the appended drawings.

Accordingly, the appended drawings are referred to as illustrations of the invention, wherein.

Figure 3:
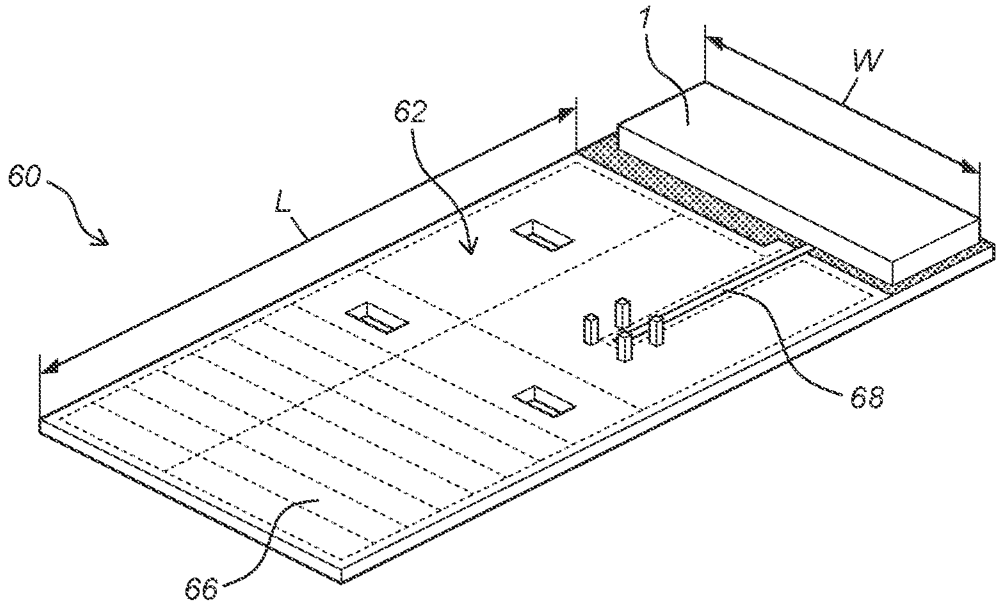
FIG. 3 shows an antenna constructed by a printed circuit board on which an antenna module is mounted according to the invention.
Figure 4:
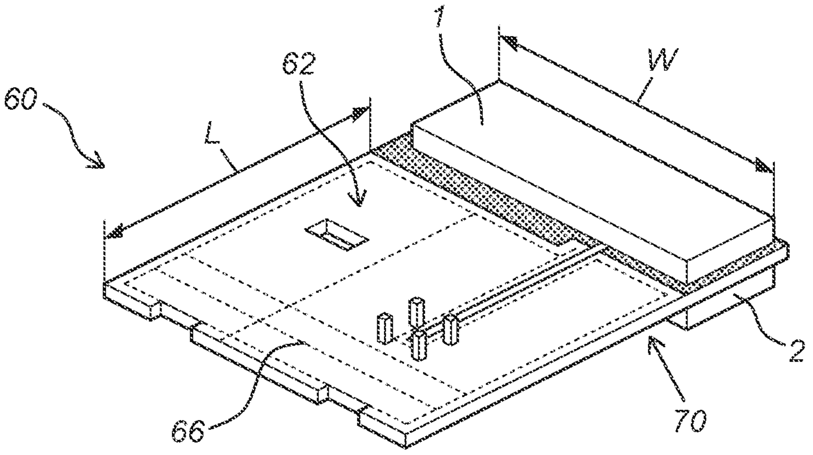
FIG. 4 shows an antenna constructed by a printed circuit board on which both an antenna module and an auxiliary module are mounted according to the invention.
Figure 5A:
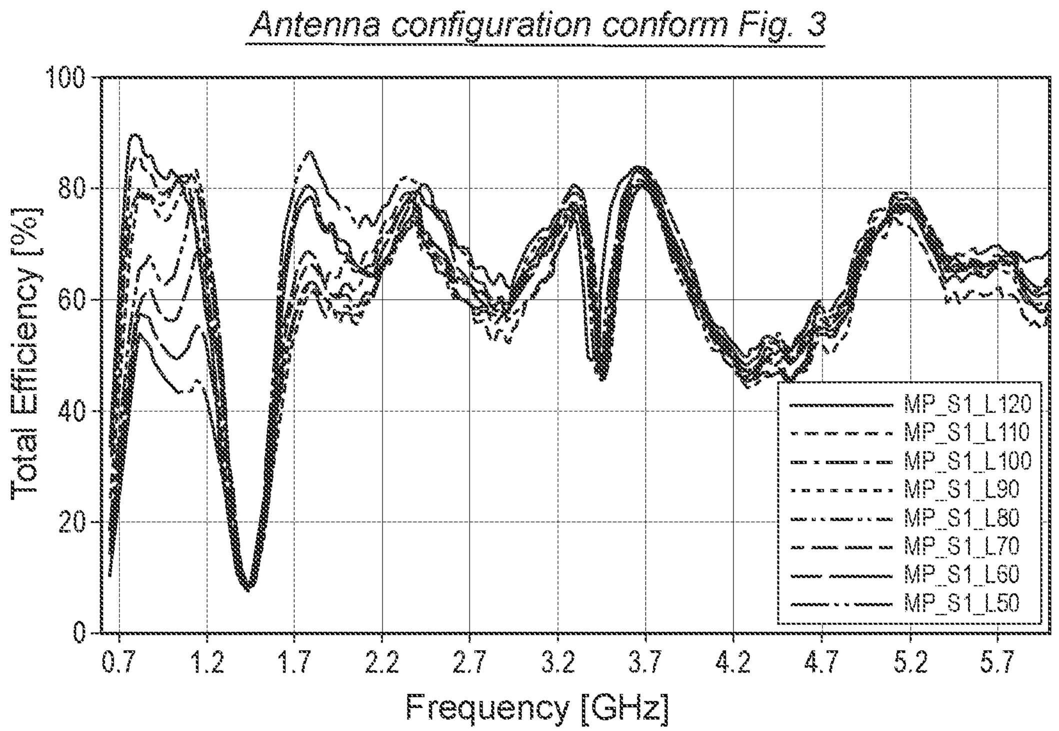
Figure 6A:
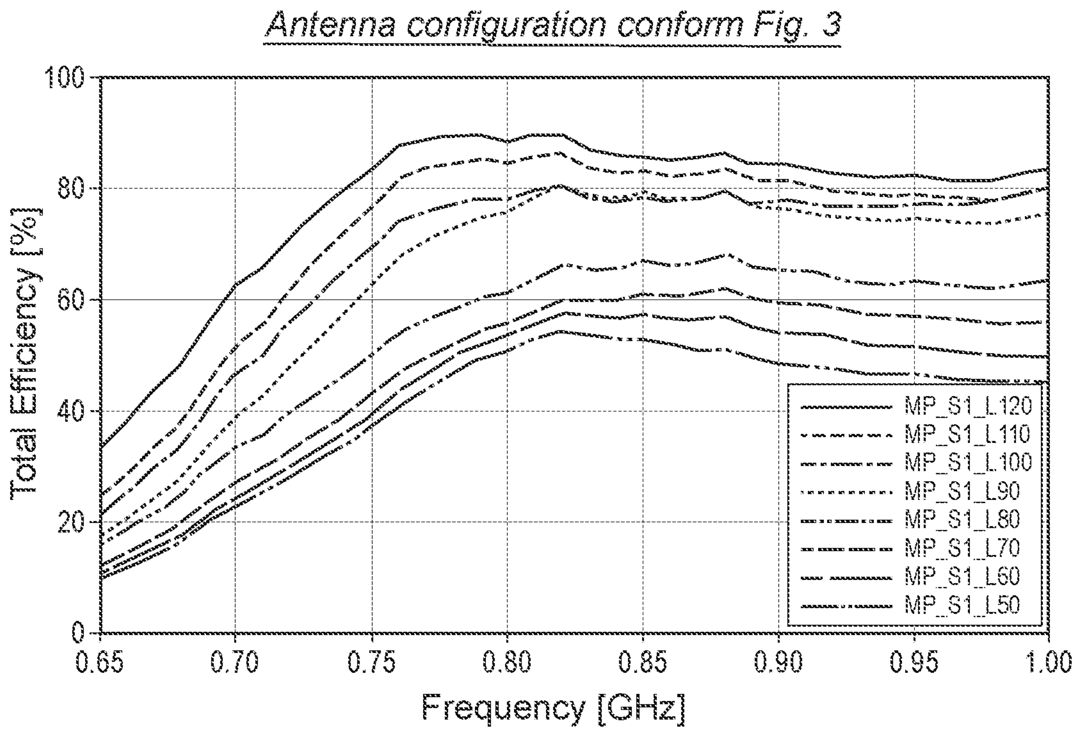

FIG. 5A/B show graphs of the total efficiency of the antenna depicted in respective FIGS. 3 and 4, over a broad frequency range and for various ground plane lengths of the printed circuit board;

FIG. 6A/B show graphs of the total efficiency of the antenna depicted in respective FIGS. 3 and 4, over a small frequency range and for various ground plane lengths of the printed circuit board.

Figure 1:
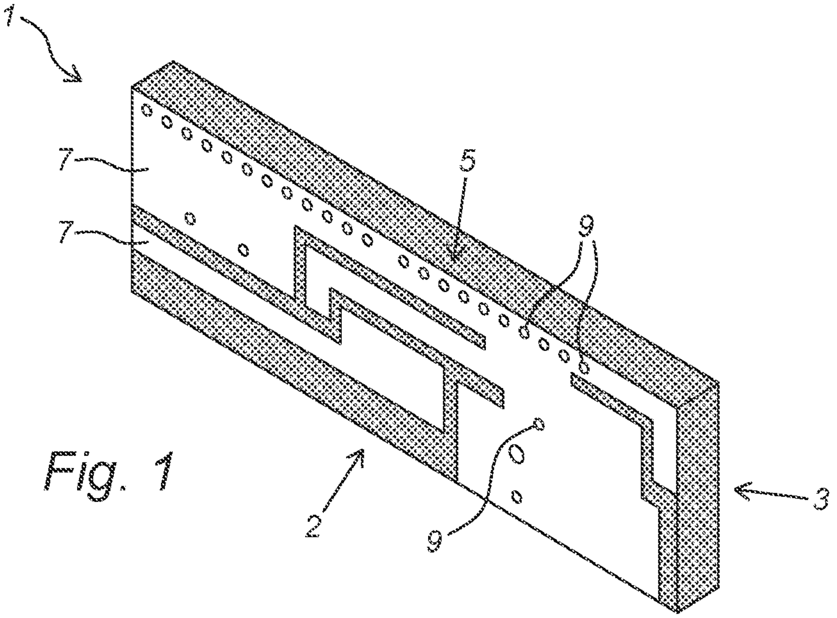
FIG. 1 shows a perspective view of an antenna module according to the invention.
Figure 1A:
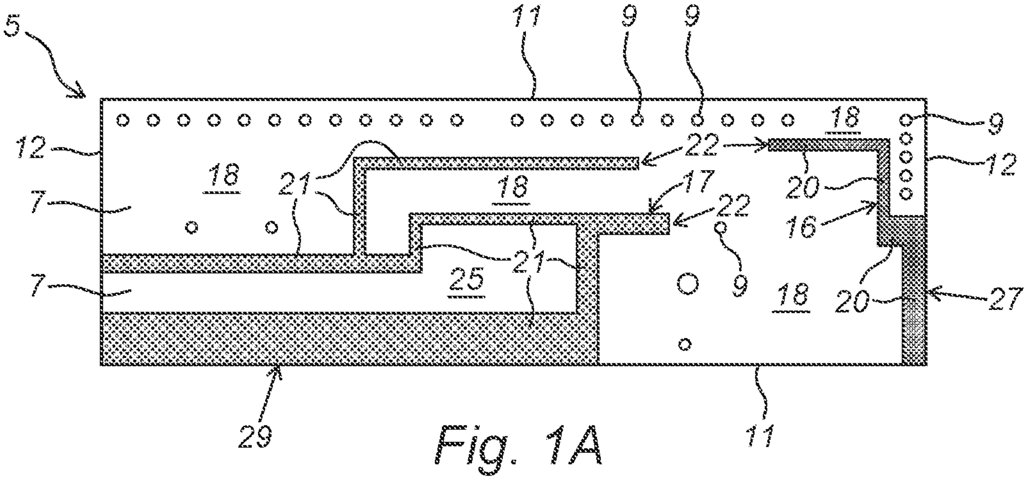
FIGS. 1A and 1B show a top-view and a bottom-view of the antenna module shown in FIG. 1.
Figure 1B:
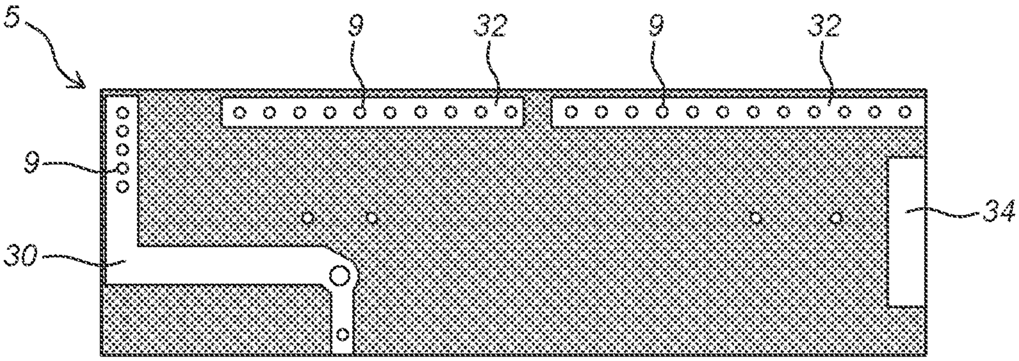

FIG. 1 shows an antenna module 1, which is embodied as a planar body having a top surface 2 and a bottom surface 3, wherein the bottom surface is configured to be mounted on a printed circuit board and the top surface 2 is facing away from the bottom surface 3, wherein the planar body is a layered structure comprising:

a central planar layer 5 of dielectric material;

a first circuitry of electrically conductive material on a bottom side of the central planar layer 5 (not visible; shown in FIG. 1B);

a second circuitry of electrically conductive material on a top side of the central planar layer 5;

a multitude of vias 9 of electrically conductive material that extend through the central planar layer 5 from the bottom side to the top side thereof;

wherein the antenna module 1 is an electrically active component wherein the second circuitry is formed by a radiation layer 7 of electrically conductive material which radiation layer is electrically connected to at least some, and preferably all, of the vias 9.

FIG. 1A shows a top surface of the antenna module 1 which is constructed by a top side of the central planar layer 5 on which a radiation layer 7 of electrically conductive material is provided. The radiation layer has two long outer edges 11 extending in a width direction and two short outer edges 12 extending in a length direction, together forming a periphery of the radiation layer 7.

The radiation layer 7 is provided with two slots 16 and 17 that divide the radiation layer 7 into sections that are interconnected to each other as branches 18, which include L-shaped branches 18. The radiation layer 7 which is composed of these interconnected sections, is furthermore connected to vias 9.

The first slot 16 extends from the short outer edge 12 (at the right-hand side of the figure) and has one end extending in the radiation layer as an isolated dead-end 22. The first slot 16 is composed by a linkage of linear slot sections 20 that includes a linkage of two L-shaped slot sections which together form a zig-zag shape.

The second slot 17 extends from a short outer edge 12 (at the left-hand side of the figure), to a long outer edge 11 (at the bottom side of the figure). The second slot 17 is furthermore composed by a linkage of linear slot sections 21 which linkage includes one F-shaped slot section and two L-shaped slot sections, and wherein the two L-shaped slot sections each have one end extending in the radiation layer as an isolated dead-end 22.

The radiation layer 7 includes an isolated section 25 which is delimited by the second slot 17, which is not interconnected with other branches 18 of the radiation layer. The isolated section has an L-shaped contour and is not connected to vias 9.

Both the first slot 16 and the second slot 17 are provided with an outer linear slot section 27 resp. 29, which extends parallel to an outer edge of the radiation layer 12 resp. 11, and is present at the same outer edge 12 resp. 11, so that the outer linear slot section 27 resp. 29, forms an interruption of the respective outer edge 12 resp. 11 of the radiation layer. This interruption extends over a length equal to length of the outer linear slot section 27 resp. 29.

It is noted for the sake of completeness, that the linear slot sections 21 and 20 are all interconnected to each other in an orthogonal orientation, and extend parallel to the outer edges 11 and 12 of the radiation layer 7.

FIG. 1B shows a bottom surface of the antenna module 1 which is constructed by a bottom side of the central planar layer 5, on which a first circuitry of electrically conductive material is provided which includes a feeding strip 30 of electrically conductive material that is connected to at least some of the vias 9.

Further provided on the bottom side and part of the first circuitry, are two separate strips 32 of electrically conductive material which are connected to vias 9. One strip 34 is provided which is not connected to vias 9.

The shown bottom side of the antenna module is configured to be mountable on a surface of a printed circuit board for instance by soldering, by gluing, or by the use of mechanical connectors.

Figure 2:
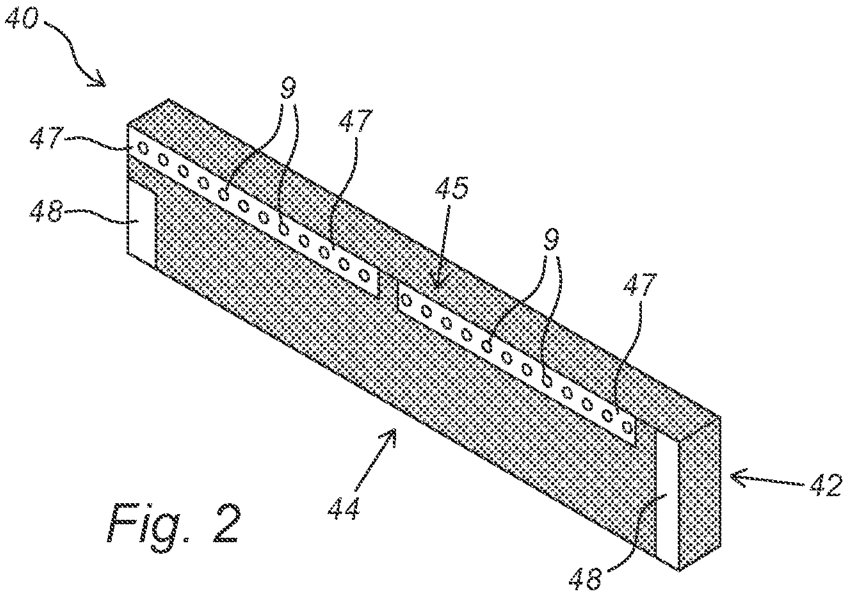
FIG. 2 shows a perspective view of an auxiliary antenna module according to the invention.
Figure 2A:
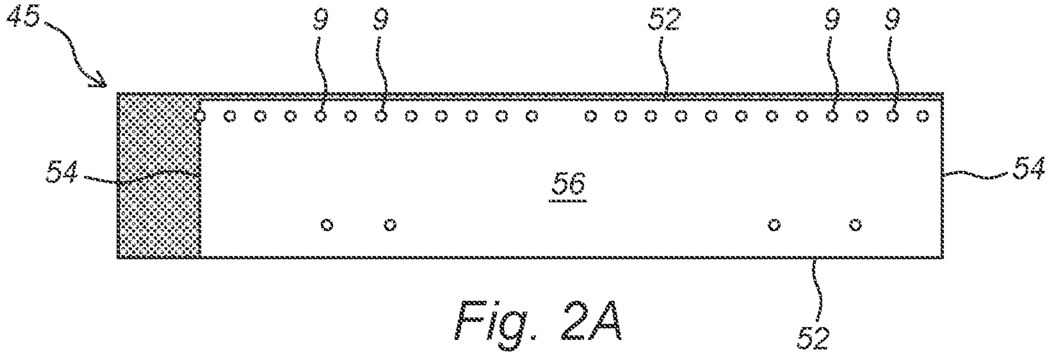
FIGS. 2A and 2B show a top-view and a bottom-view of the auxiliary antenna module shown in FIG. 2.

FIG. 2 shows an auxiliary antenna module 1, which is embodied as a planar body having a top surface 42 and a bottom surface 44, wherein the bottom surface 44 is configured to be mounted on the printed circuit board and the top surface 42 is facing away from the bottom surface, wherein the planar body is a layered structure comprising:

a central planar layer 45 of dielectric material;

separate strips 47, 48 of electrically conductive material provided on a bottom side of the central planar layer 45;

an auxiliary layer of electrically conductive material on a top side of the central planar layer 45 (not visible; shown in FIG. 2A);

a multitude of vias 9 of electrically conductive material that extend through the central planar layer 45 from the bottom side to the top side thereof;

wherein the separate strips 47 on the bottom side of the central planar layer are connected to vias 9, the separate strips 48 are not connected to vias 9.

FIG. 2A shows a top side of the central planar layer 45, on which an auxiliary layer 50 of electrically conductive material is provided, which auxiliary layer 50 is connected to all of the vias 9. The auxiliary layer 50 has a rectangular shape with a periphery containing two long outer edges 52 extending in a width direction, and two short outer edges 54 extending in a length direction.

Figure 2B:
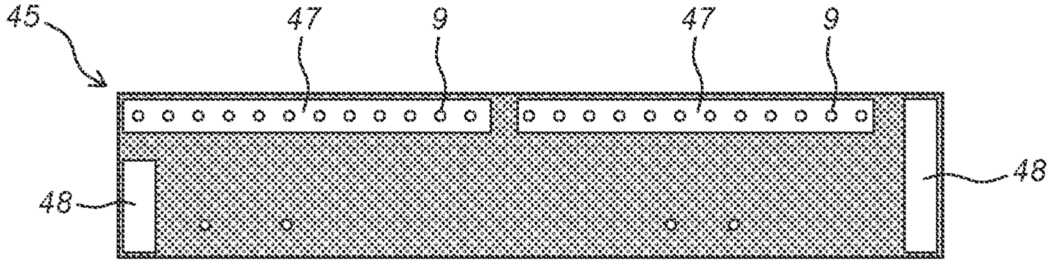

FIG. 2B shows a bottom side of the central planar layer 45, on which two separate strips 47 are provided which are connected to vias 9, and two separate strips 48 are provided which are not connected to vias 9.

FIG. 3 shows a perspective view of a printed circuit board 60 having a first surface side 62 on which an antenna module 1 is mounted which antenna module is conform the type shown in FIG. 1.

The printed circuit board 60 contains an electrically conductive layer 66 that constitutes a ground plane for the antenna module 1, and furthermore contains a feeding strip 68 which is electrically connected to the feeding strip of the antenna module 1. The surface side 62 on which the antenna module 1 is mounted is a dedicated surface area in which area the ground plane 66 does not extend. Accordingly, the ground plane 66 has a length L as indicated and a width that is comparable to the width W of the antenna module.

The shown combination of the printed circuit board 60 and the antenna module 1 mounted thereon, is a configuration which is functional as an antenna in accordance with the invention.

FIG. 4 shows a perspective view of a printed circuit board 60 having a first surface side 62 on which an antenna module 1 is mounted which antenna module is conform the type shown in FIG. 1, and a second, opposed surface side 70 on which an auxiliary antenna module 1 is mounted which auxiliary antenna module 40 is conform the type shown in FIG. 2.

The printed circuit board 60 contains an electrically conductive layer 66 that constitutes a ground plane for the antenna module 1, and furthermore contains a feeding strip 68 which is electrically connected to the feeding strip of the antenna module 1. Both surface sides 62 and 70 on which the respective antenna module 1 and the auxiliary antenna module 40 are mounted, are dedicated surface areas in which the ground plane 66 does not extend. Accordingly, the ground plane 66 has a length L as indicated and a width that is comparable to the width W of the antenna module.

The antenna module 1 and auxiliary antenna module 40, form a co-operating assembly of two antenna modules which are mounted on the printed circuit board 60, which configuration as a whole is functional as an antenna in accordance with the invention.

FIG. 5A shows graphs of the total efficiency of the antenna conform the configuration shown in FIG. 3, measured over a broad frequency range (from 0.6 to 6.0 GHz) for various ground plane lengths of the printed circuit board. Each individual graph corresponds to a specific ground plane length of the PCB, which ranges from 50 mm to 120 mm by increments of 10 mm. For each individual graph, the length is indicated by the letter L, such that L70 for instance indicated a ground plane length of 70 mm.

The results show an attractive total efficiency above 35% for all the antennas within the frequency range of 1.5 GHz to 6.0 GHz up to a relatively small ground plane length of 50 mm.

Figure 5B:
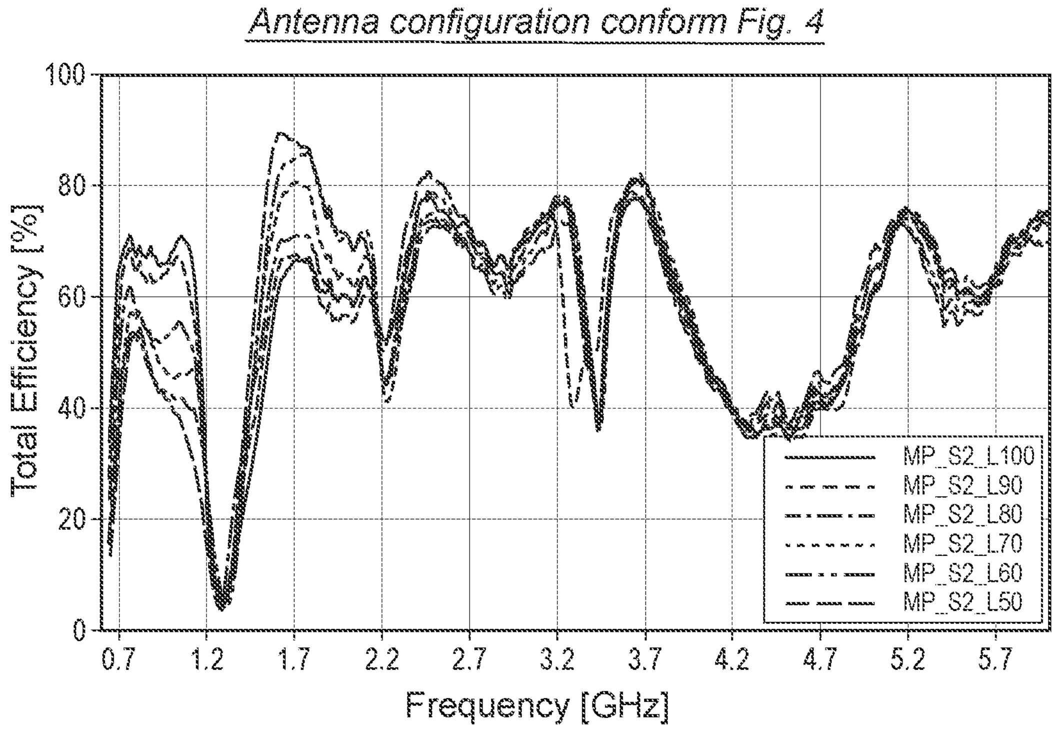

FIG. 5B shows graphs of the total efficiency of the antenna conform the configuration shown in FIG. 4, measured over a broad frequency range (from 0.6 to 6.0 GHz) for various ground plane lengths of the printed circuit board, which ranges from 50 mm to 100 mm by increments of 10 mm. For each individual graph, the length is indicated by the letter L, such that L70 for instance indicated a ground plane length of 70 mm.

The results show an attractive total efficiency above 35% for all the antennas within the frequency range of 1.5 GHz to 6.0 GHz up to a relatively small ground plane length of 50 mm.

FIG. 6A shows graphs of the total efficiency of the antenna conform the configuration shown in FIG. 3, measured over a small frequency range (from 0.65 to 1.00 GHz) for various ground plane lengths of the printed circuit board in accordance with the variants shown in FIG. 5A. The graphs of FIG. 6A are therefore consistent with the graphs shown in FIG. 5A, but they are depicted for a smaller frequency range and are magnified accordingly.

The results show an attractive total efficiency above 35% for the antennas within the frequency range of 0.65 GHz to 1.00 GHz, when the length of the ground plane is 80 mm or larger.

Figure 6B:
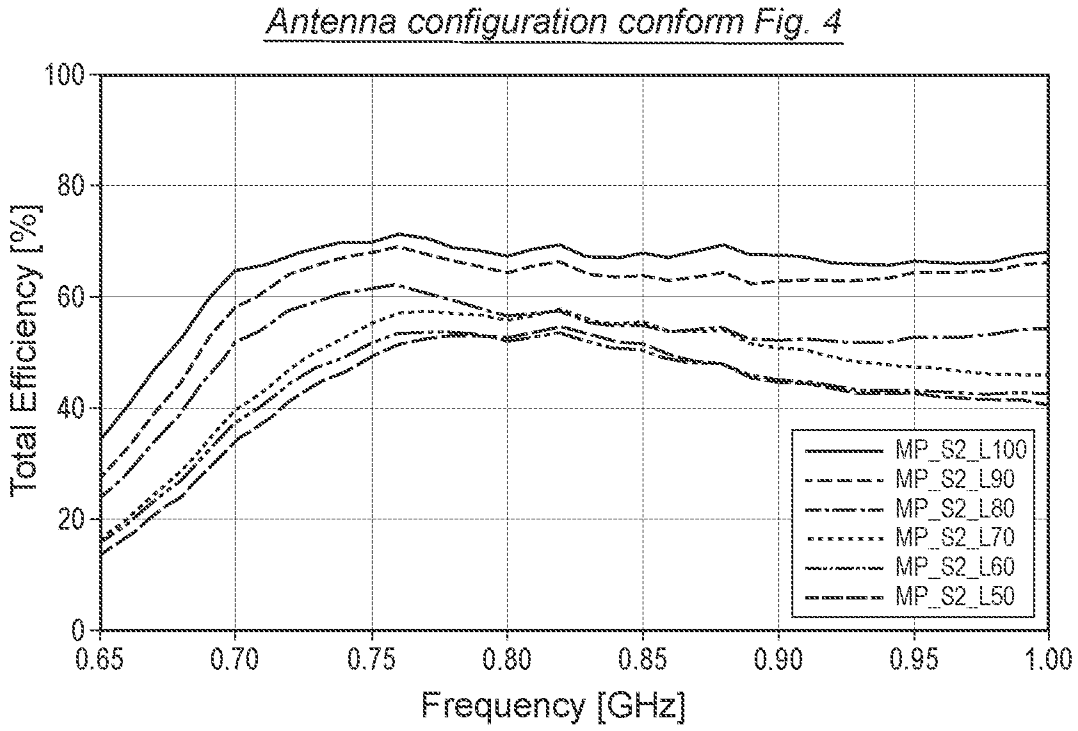

FIG. 6B shows graphs of the total efficiency of the antenna conform the configuration shown in FIG. 4, measured over a small frequency range (from 0.65 to 1.00 GHz) for various ground plane lengths of the printed circuit board in accordance with the variants shown in FIG. 5B. The graphs of FIG. 6B are therefore consistent with the graphs shown in FIG. 5B, but they are depicted for a smaller frequency range and are magnified accordingly.

The results show an attractive total efficiency above 35% for the antennas within the frequency range of 0.65 GHz to 1.00 GHz, when the length of the ground plane is 50 mm or larger.

In summary of the results shown in the graphs, it has been found that:

- An antenna which according to the invention is formed by an antenna module mounted onto a printed circuit board (i.e. conform the configuration of FIG. 3), is capable of:
  - achieving an attractive total efficiency within the frequency range of 1.5 GHz to 6.0 GHz up to a relatively small ground plane length of 50 mm;
  - achieving an attractive total efficiency within the frequency range of 1.5 GHz to 6.0 GHz up to a relatively small ground plane length of 80 mm.
- An antenna which according to the invention is formed by an assembly of an antenna module and an auxiliary antenna module mounted onto a printed circuit board (i.e. conform the configuration of FIG. 4), is capable of:
  - achieving an attractive total efficiency within the frequency range of 1.5 GHz to 6.0 GHz up to a relatively small ground plane length of 50 mm;
  - achieving an attractive total efficiency within the frequency range of 1.5 GHz to 6.0 GHz up to a relatively small ground plane length of 50 mm.

It is therefore concluded that the mountable antenna module according to the invention offers an improvement over the prior art, in regard of achieving an attractive total efficiency for a relatively small ground plane length of 50 mm within the frequency range of 1.5 GHz to 6.0 GHz, and for a relatively small ground plane length of 80 mm within the frequency range of 1.5 GHz to 6.0 GHz. The invention thus achieves an attractive total efficiency when the antenna module is mounted onto a relatively small printed circuit board having a ground plane of a length below 100 mm.

The above advantageous effect can even be further improved in accordance with the present invention, by the provision of a set of an antenna module and an auxiliary antenna module, which are mountable onto a printed circuit board and which function as a co-operating assembly of two antenna modules when mounted onto the PCB. In this way, an attractive total efficiency of the resultant antenna is attainable for a relatively small ground plane length of 50 mm within the frequency range of 1.5 GHz to 6.0 GHz, as well as within the frequency range of 1.5 GHz to 6.0 GHz. By this further improvement, the invention is thus capable of achieving an attractive total efficiency of the resultant antenna, even when mounted onto a relatively small printed circuit board having a ground plane that has a length below 80 mm.

The invention claimed is:

1. An antenna module which is mountable on a surface of a printed circuit board which contains an electrically conductive layer that constitutes a ground plane for the antenna module, wherein the antenna module is embodied as a planar body having a top surface and a bottom surface, wherein the bottom surface is configured to be mounted on the printed circuit board and the top surface is facing away from the bottom surface, wherein the planar body is a layered structure comprising:

a central planar layer of dielectric material;

a first circuitry of electrically conductive material on a bottom side of the central planar layer;

a second circuitry of electrically conductive material on a top side of the central planar layer;

a multitude of vias of electrically conductive material that extend through the central planar layer from the bottom side to the top side thereof;

wherein the antenna module is an electrically active component and the first circuitry includes a feeding strip of electrically conductive material that is connected to at least some of the vias, wherein the second circuitry is formed by a radiation layer of electrically conductive material which radiation layer is electrically connected to at least some of the vias, which radiation layer has outer edges that constitute a periphery of the radiation layer, wherein the radiation layer is provided with multiple slots that divide the radiation layer into sections that are interconnected to each other as branches, wherein the slots are provided in the radiation layer in such a way that each of the slots extend from an outer edge of the radiation layer, and wherein the radiation layer includes one or more isolated sections which are delimited by one or more slots and which are not interconnected with other sections of the radiation layer, wherein the isolated sections function as a passive component when the antenna module is in operation.

2. The antenna module according to claim 1, wherein the bottom side of the central planar layer furthermore includes one or more separate strips of electrically conductive material, which separate strips comprise strips that are connected to vias, and/or strips that are not connected to vias.

3. The antenna module according to claim 1, wherein the slots include a slot which has one end extending from one outer edge of the radiation layer and another end extending from another outer edge of the radiation layer.

4. The antenna module according to claim 1, wherein the slots include one or more slots which extend from one outer edge of the radiation layer and has one end extending in the radiation layer as an isolated dead-end.

5. The antenna module according to claim 1, wherein the slots are composed by a linkage of linear slot sections which are interconnected to each other in an orthogonal orientation, such that the slots comprise slot sections which are L-shaped and/or F-shaped.

6. The antenna module according to 1, wherein the slots are composed by a linkage of linear slot sections which extend parallel to one or more of the outer edges of the radiation layer.

7. The antenna module according to claim 1, wherein at least one slot has an outer linear slot section which extends parallel to an outer edge of the radiation layer and is present at the same outer edge so that the outer linear slot section forms an interruption of the respective outer edge of the radiation layer, which interruption extends over a length equal to length of the outer linear slot section.

8. The antenna module according to claim 1, wherein the radiation layer has a width and a length, and the periphery of the radiation layer comprises two long outer edges extending in the width direction, and two short outer edges extending in the length direction in a rectangular shape.

9. The antenna module according to claim 1, wherein the central planar layer has a width and a length, and has a periphery comprising two long outer edges extending in the width direction, and two short outer edges extending in the length direction, wherein a substantial part of the central planar layer is covered by the radiation layer.

10. The antenna module according to claim 1, wherein the slots comprise a first slot which is composed by a linkage of linear slot sections that includes one L-shaped slot section, which first slot has one end extending in the radiation layer as an isolated dead-end.

11. The antenna module according to claim 10, wherein the first slot extends to a first outer edge of the radiation layer which is an outer edge extending in a length direction of the radiation layer.

12. The antenna module according to claim 1, wherein the slots comprise a second slot which is composed by a linkage of linear slot sections, which linkage includes at least one F-shaped slot section and at least one L-shaped slot section.

13. The antenna module according to claim 12, wherein the second slot includes one or two L-shaped slots which have one end extending in the radiation layer as an isolated dead-end.

14. The antenna module according to claim 12, wherein the second slot extends to a second outer edge of the radiation layer which is an outer edge extending in a length direction of the radiation layer.

15. Antenna module according to claim 14, wherein the second slot extends from the second outer edge of the radiation layer to a third outer edge of the radiation layer.

16. The antenna module according to claim 1, wherein the sections of the radiation layer that are interconnected include one, two or more branches that have an L-shaped contour.

17. The antenna module according to claim 1, wherein the radiation layer contains at least one isolated section which has an L-shaped contour.

18. The antenna module according to claim 1, wherein the antenna module has:

an overall width from 40 mm to 60 mm;

and/or an overall length of 10 mm to 30 mm;

and/or an overall thickness of 2 mm to 5 mm.

19. A set of two antenna modules which are both mountable on a surface of a printed circuit board in order to form a co-operating assembly of two antenna modules on the printed circuit board which contains an electrically conductive layer that constitutes a ground plane for both antenna modules, wherein the set of two antenna modules contains an antenna module according to claim 1 and an auxiliary antenna module, wherein the auxiliary antenna module is embodied as a planar body having a top surface and a bottom surface, wherein the bottom surface is configured to be mounted on the printed circuit board and the top surface is facing away from the bottom surface, wherein the planar body is a layered structure comprising:

a central planar layer of dielectric material;

separate strips of electrically conductive material provided on a bottom side of the central planar layer;

an auxiliary layer of electrically conductive material on a top side of the central planar layer;

a multitude of vias of electrically conductive material that extend through the central planar layer from the bottom side to the top side thereof;

wherein the auxiliary antenna module is a passive component which is not fed by an electric feed, wherein the auxiliary layer is connected to at least some of the vias, and wherein the separate strips on the bottom side of the central planar layer comprise strips that are connected to vias, and/or strips that are not connected to vias.

20. The set of two antenna modules according to claim 19, wherein the auxiliary layer has a width and a length, and has a periphery comprising two long outer edges extending in the width direction, and two short outer edges extending in the length direction.

21. The set of two antenna modules according to claim 19, wherein the central planar layer has a width and a length, and has a periphery comprising two long outer edges extending over the width, and two short outer edges extending over the length, wherein a substantial part of the central planar layer is covered by the auxiliary layer.

22. The set of two antenna modules according to claim 19, wherein the auxiliary antenna module has:

an overall width from 40 mm to 60 mm;

and/or an overall length of 5 mm to 20 mm;

and/or an overall thickness of 2 mm to 5 mm.

23. A printed circuit board having a surface side on which an antenna module according to claim 1 is mounted, wherein the printed circuit board contains an electrically conductive layer that constitutes a ground plane for the antenna module.

24. The printed circuit board according to claim 23, having a surface side on which an auxiliary antenna module is mounted, wherein the antenna module and the auxiliary antenna module are mounted on the printed circuit board thereby forming a co-operating assembly which interacts with the ground plane of the printed circuit board.

25. The printed circuit board according to claim 23, wherein the surface side of the printed circuit board on which the antenna module is mounted is a dedicated surface area in which area the ground plane does not extend, and/or wherein the surface side of the printed circuit board on which the auxiliary antenna module is mounted, is a dedicated surface area in which area the ground plane does not extend.

26. The printed circuit board according to claim 23, wherein the ground plane of the printed circuit board has:

an overall width from 40 mm to 60 mm, and/or an overall length of 30 mm to 100 mm.

27. An antenna module which is mountable on a surface of a printed circuit board which contains an electrically conductive layer that constitutes a ground plane for the antenna module, wherein the antenna module is embodied as a planar body having a top surface and a bottom surface, wherein the bottom surface is configured to be mounted on the printed circuit board and the top surface is facing away from the bottom surface, wherein the planar body is a layered structure comprising:

a central planar layer of dielectric material;

a first circuitry of electrically conductive material on a bottom side of the central planar layer;

a second circuitry of electrically conductive material on a top side of the central planar layer;

a multitude of vias of electrically conductive material that extend through the central planar layer from the bottom side to the top side thereof;

wherein the antenna module is an electrically active component and the first circuitry includes a feeding strip of electrically conductive material that is connected to at least some of the vias, wherein the second circuitry is formed by a radiation layer of electrically conductive material which radiation layer is electrically connected to at least some of the vias, which radiation layer has outer edges that constitute a periphery of the radiation layer, wherein the radiation layer is provided with multiple slots that divide the radiation layer into sections that are interconnected to each other as branches, wherein the slots are provided in the radiation layer in such a way that each of the slots extend from an outer edge of the radiation layer, and wherein the slots comprise a second slot which is composed by a linkage of linear slot sections, which linkage includes at least one F-shaped slot section and at least one L-shaped slot section.

* * * * *